United States Patent

Kipping

[15] 3,641,334
[45] Feb. 8, 1972

[54] ILLUMINATED MIRROR FOR COSMETIC CASE

[72] Inventor: Vernon L. Kipping, San Francisco, Calif.

[73] Assignees: Roger J. Jobson; John P. Costello, San Francisco, Calif., part interest to each

[22] Filed: Aug. 29, 1969

[21] Appl. No.: 854,249

Related U.S. Application Data

[63] Continuation-in-part of Ser. No. 718,390, Apr. 3, 1968.

[52] U.S. Cl. ..........................240/6.45 R, 240/2 R, 350/296
[51] Int. Cl. ...................................................A45c 15/06
[58] Field of Search ...................240/6.45 R, 6.4 R, 2 R, 4.2, 240/41.35 A, 6, 41.2, 41.5; 350/149, 141

[56] References Cited

UNITED STATES PATENTS

| | | | |
|---|---|---|---|
| 1,979,542 | 11/1934 | Hauser et al. | 240/4.2 |
| 2,247,319 | 6/1941 | Snidow | 240/4.2 |
| 2,287,052 | 6/1942 | Munroe et al. | 240/41.35 A |
| 2,572,095 | 10/1951 | Baillie | 240/6.45 |
| 2,878,367 | 3/1959 | Siemss | 240/6.46 X |
| 3,250,908 | 5/1966 | Lawrence et al. | 240/4.2 X |

Primary Examiner—S. Clement Swisher
Assistant Examiner—Daniel M. Yasich
Attorney—Julian Caplan

[57] ABSTRACT

A mirror, preferably handheld, has a light bulb disposed behind the mirror and a source of current within a casing. The bulb is located relative to a light reflective surface to direct light onto a beam dividing reflector, so that the light is reflected around the side edges of the mirror to shine onto the face of the user thereby providing sufficient illumination to permit use independent of other light. The light produced has a field sufficient in size to illuminate the entire face of the user and is characterized by softness. The system employs reflective optics to converge and distribute light uniformly over the illuminated object.

5 Claims, 7 Drawing Figures

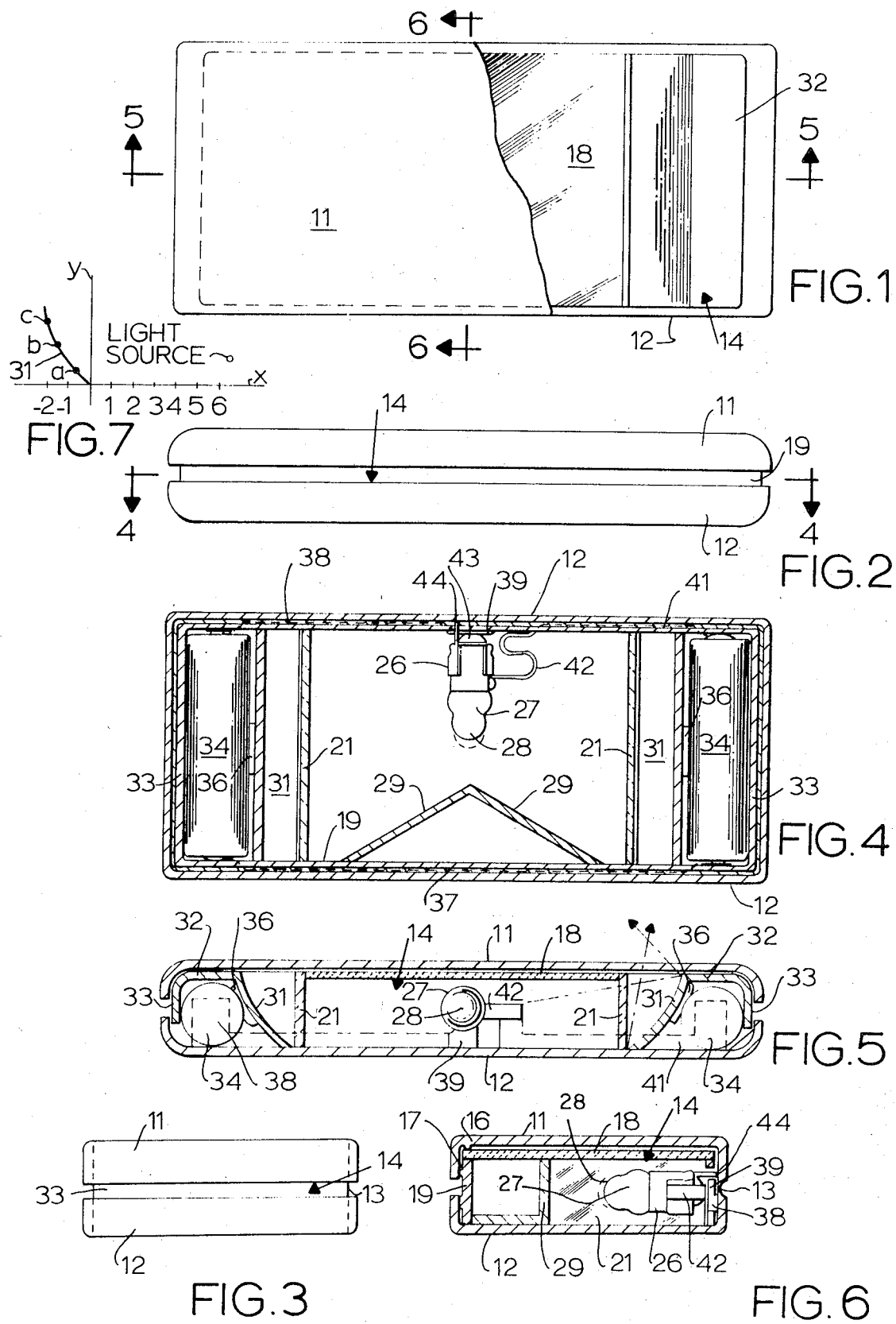

ILLUMINATED MIRROR FOR COSMETIC CASE

This application is a continuation-in-part of copending application Ser. No. 718,390, filed Apr. 3, 1968.

This invention relates to a mirror with integral optical light source. A miniature bulb with lens in bulb is located behind the mirror and the light from such source is directed parallel to and behind the mirror to a beam-dividing reflective surface which directs the light around two side edges of the mirror and focuses in front of the mirror where the face of the user would normally be located. Hence the light source provides sufficient illumination for use of the mirror even in the dark. The light path is such that the illumination is soft and flattering, making the device particularly useful for application of cosmetics. A preferred use of the invention is installed in compacts, although it has further application in vanity mirrors and in shaving mirrors.

An important feature of the present invention is that it utilizes reflective optics to converge light rays from the light source and distribute the same in a field of uniform intensity.

Another important feature of the invention is the means for controlling the quality of light with respect to softness or hardness by controlling the surfaces of the lens and reflector. A satin-finish reflector produces a soft light while a mirror surface produces a harder light.

Another feature of the invention is the fact that the light is preferably distributed around at least two sides of the mirror. Because the light is indirect it has a soft, flattering quality.

Another important feature of the invention is the compact arrangement of bulb, reflectors, and batteries with reference to the mirror, which makes it possible to install the device in the casing of a lady's compact without making the compact bulky.

Another feature of the invention is that the "temperature" of the light may be readily controlled by tinting the light source, reflector surface, lens surface, or light conductive material. Thus a pink tint is particularly flattering where the device is principally used in applying cosmetics.

Another feature of the invention is that light distribution may be controlled by varying the angle of the faces of the beam splitter and changing the curvature of the secondary reflectors.

Other objects of the present invention will become apparent upon reading the following specification and referring to the accompanying drawings in which similar characters of reference represent corresponding parts in each of the several views.

In the drawings:

FIG. 1 is a top plan of a compact incorporating this invention, partially broken away to reveal internal construction.

FIG. 2 is a front elevation.

FIG. 3 is a side elevation.

FIG. 4 is a sectional view taken substantially along line 4—4 of FIG. 2.

FIGS. 5 and 6 are sectional views taken substantially along lines 5—5 and 6—6 respectively, of FIG. 1.

FIG. 7 is a schematic view showing the mathematical derivation of the curvature of the secondary reflectors.

In the accompanying drawings there is shown a position inverted from the position of normal use, a typical installation, namely, a lady's compact having a shell-like bottom casing 11 and a similarly shaped top casing 12, each having rounded corners and edges. The two casings are hinged together by a piano-type hinge 13 along one longitudinal edge. Casing 11, 12 may be provided with means for holding cosmetics (not shown) of any conventional type.

The top casing 12 has an irregularly shaped, snap-in transparent inner cover 14, having the outside dimensions of top casing 12 and containing and shielding all the parts disposed within said casing. Inner cover 14 projects above the edges of casing 12 so that it is exposed through the gap between the casing edges, as best shown in FIG. 2. As shown in FIG. 6, cover 14 is formed with one or more detents 16, which fit into matching depressions on the inside of casing 11 to hold the casings closed between uses. At the center, the outer of cover 14 is chrome-plated to provide a rectangular mirror 18. Below mirror 18 cover 14 has depending front leg 19 and side legs 21 which snap into bottom casing 12. On the hinge side of casing 12 is a socket 26 which receives a miniature electric bulb 27 having a lens 28 on its outer end. The principal axis of bulb 27 is perpendicular to the edge of the casing on which the socket is mounted and is parallel to mirror 18. On the edge of the casing opposite lamp socket 26 is a beam dividing reflector 29 which is an angular member having an included angle of about 120°, and having highly reflective surfaces. Light emitted from bulb 27 is reflected by beam splitter 29 toward either end of the casing. To augment reflection of the light the inside of casing 12 and the underside of cover 14 are reflective. Legs 21 are transparent.

Immediately outwardly of end legs 21 on either side of the compact, cover 14 is formed with reflective curved surfaces 31 which function as secondary reflectors to direct the light outwardly around the side edges of mirror 18. A preferred configuration of said curved surface 31 is hereinafter described in detail. Surface 31 directs the light from bulb 27 approximately at a focus spaced from the mirror 18 the normal distance which a user's face is spaced from a mirror. The light coming from both sides of the mirror 18 illuminates the face with a soft, uniform light which is sufficiently strong for application of cosmetics.

Cover 14 outwardly of curved surface 31 on either side has a horizontal outward directed stretch 32 parallel to the bottom of casing 12 inside the side of casing 12. The space between stretch 32 and the bottom of casing 12 is sufficient for a 1.5-volt alkaline battery 34 of the so-called "pen light" variety. A pad 36 of styrene, felt, or the like, fits between battery 34 and surface 31 and secures the battery against rattling. There being one battery 34 on each side, it is desirable that the two batteries be wired in series. Accordingly, a first strip 37 of conductive metal makes contact with the bottom end of the battery on the left, as viewed in FIG. 4, and the bottom end of the battery on the right, the two batteries being reversed in direction. The top of left-hand battery 34 is connected by strip 38 to a terminal 39 on the sidewall of casing 12. The top of right-hand battery 34 makes contact with strip 41 which has a convoluted spring portion 42 immediately before it is connected to socket 26. Spring 42 functions to bias terminal 43 of bulb 27 against terminal 39. Socket 26 has a probe 44 which extends out through a hole in casing 12 and is depressed by casing 11 when the compact is closed, thus disengaging terminals 43, 39 and extinguishing bulb 26. However, when casing 11 is open, probe 44 is free to extend and terminals 39, 44 are engaged. Accordingly, whenever the casings 11, 12 are open the lamp is illuminated.

To obtain access of the bottom casing in order to change batteries 34 or bulb 27, cover 14 snaps out of engagement with casing 12.

With respect to the curvature of surface 31, in a preferred form on an x–y axis there are three points, $a$, $b$, $c$, chosen on the curve 31. The formula employed is:

$$(x_1, y_1)$$
$$(x_2, y_2)$$
$$(x_3, y_3)$$
$$y = c + bx + ax^2$$
$$y_1 = c + b(x_1) + a(x_1)^2$$
$$y_2 = c + b(x_2) + 1(x_3)^2$$
$$y_3 = c + b(x_3) + a(x_3)^2$$

Solution of points $a$, $b$, $c$, on surface 31 is:

$$a = \frac{(y_1 - y_2) - (x_1 - x_2)b}{(x_1)^2 - (x_2)^2}$$

$$b = \frac{(y_1 - y_2) - [(x_1) + (x_2)^2]a}{(x_1 - x_2)}$$

$$c = y_1 - b(x_1) - a(x_1)^2$$

By varying the curvature of surface 31 and by varying the angle between surfaces 29, the light distribution may be controlled. By tinting or otherwise altering the surface characteristics of the reflectors 29, 31, the transparent areas 21 and the mirror 18 the quality of the illumination may be varied, i.e., softness or hardness.

What is claimed is:

1. A handheld mirror combination comprising a shell-like casing having a substantially flat back which is reflective on its interior surface, a bulb at one side edge of said casing disposed parallel to said back, a beam-dividing reflector on the other side edge of said casing disposed to direct light from said bulb toward opposite ends of said casing, a secondary reflector fixed to said casing adjacent each end of said casing positioned to reflect light from said beam-dividing reflector outward from said back, a mirror parallel to said back and between said secondary reflectors, and current means for illuminating said bulb, each said secondary reflector curved and shaped upwardly and outwardly from the outside edges of said mirror to focus light at a position in front of said mirror to illuminate the user'face.

2. A mirror combination according to claim 1, in which said mirror has translucent legs extending to said back and supporting said mirror space from said back, said legs interposed between said beam-dividing reflector and said secondary reflectors.

3. A mirror combination according to claim 1, in which said bulb is of a type having a lens disposed at its outer end, said lens focusing a substantial portion of the light from said bulb toward said beam-dividing reflector.

4. A mirror combination according to claim 1, in which a space is provided adjacent either end of said casing between said secondary reflector and said end, said current means comprising a pair of batteries, one in each said space, and wiring means interconnecting said batteries and said bulb.

5. A mirror combination according to claim 4, which further comprises a switch in said wiring means, said switch having a probe extending out said one side edge of said casing and which further comprises a second casing hinged to said one side edge and disposed to retract said probe to extinguish said bulb when said second casing is in closed position relative to said first-mentioned casing.

* * * * *